United States Patent
Falcioni

[15] 3,634,928
[45] Jan. 18, 1972

[54] METHOD OF RIVET JOINING

[72] Inventor: Joseph G. Falcioni, Tacoma, Wash.
[73] Assignee: The Boeing Company, Seattle, Wash.
[22] Filed: Sept. 9, 1968
[21] Appl. No.: 758,220

Related U.S. Application Data

[63] Continuation-in-part of Ser. No. 417,661, Dec. 11, 1964, Pat. No. 3,405,594.

[52] U.S. Cl. .............................. 29/509, 29/522, 29/243.53
[51] Int. Cl. ............................................ B21d 39/00, B23p 11/02
[58] Field of Search .................. 29/509, 509 R, 522, 522 R, 29/243.53; 85/37; 287/189.36

[56] References Cited

UNITED STATES PATENTS

| 1,228,239 | 5/1917 | Phillips | 85/37 |
|---|---|---|---|
| 1,457,008 | 5/1923 | Smith | 85/37 |
| 1,798,273 | 3/1931 | Pleister | 85/37 X |
| 1,934,780 | 11/1933 | Van Halteren | 85/37 X |
| 1,966,401 | 7/1934 | Andren | 85/37 |

Primary Examiner—Charlie T. Moon
Attorney—Robert W. Beach

[57] ABSTRACT

The shank or preformed head of a rivet to be driven cold and having a shank which is cylindrical over the major portion of its length has a portion reduced in size adjacent to an end to be headed in driving, such as by being stepped or necked or the underside of a preformed head on such shank is grooved adjacent to such shank. The reduced portion is located at the end of a hole in which the rivet shank is inserted so that mushrooming of the rivet into engagement with the hole end is deterred and delayed to enable the portion of the rivet shank within the central portion of the hole to be shortened during setting of the rivet and to swell to press substantially uniformly against the hole wall throughout its length.

3 Claims, 25 Drawing Figures

PATENTED JAN 18 1972 3,634,928
SHEET 1 OF 3
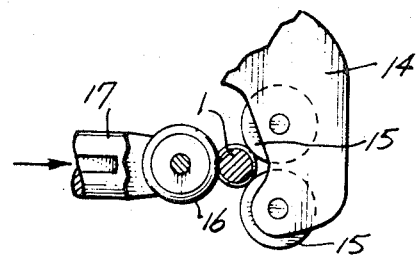
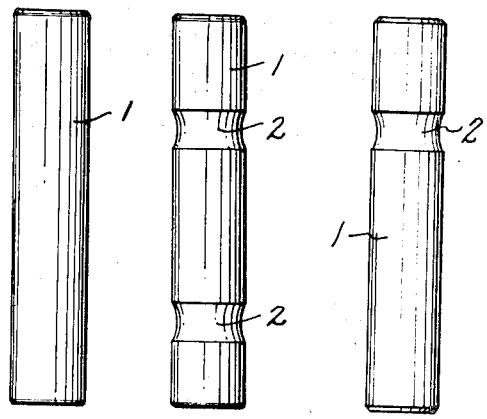
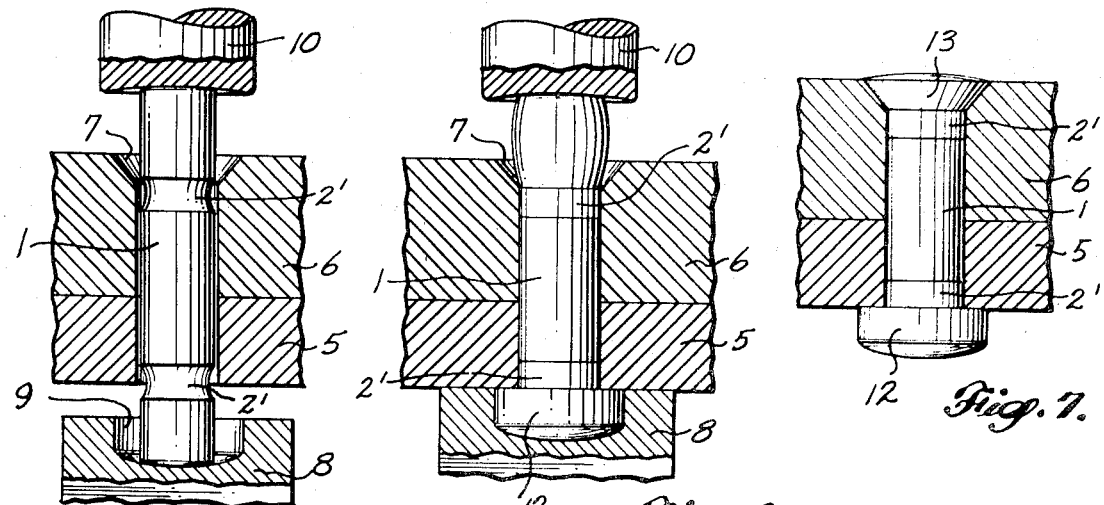
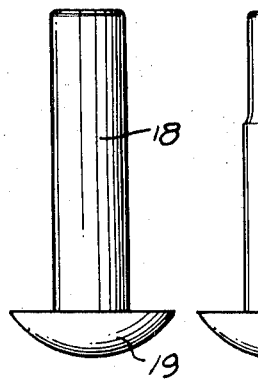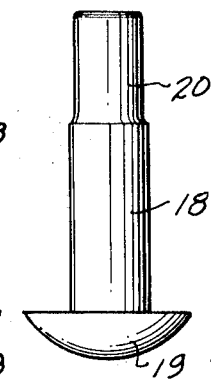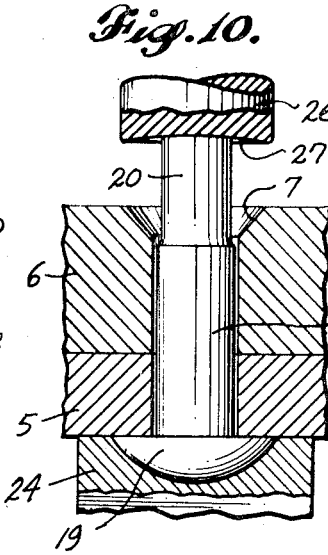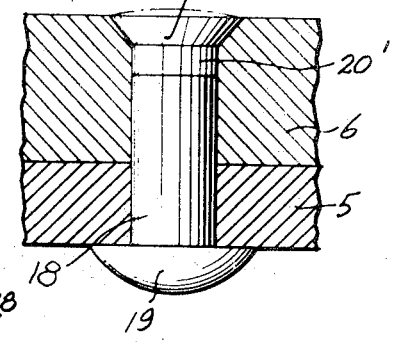
INVENTOR
JOSEPH G. FALCIONI
BY
Robert W. Beach
ATTORNEY

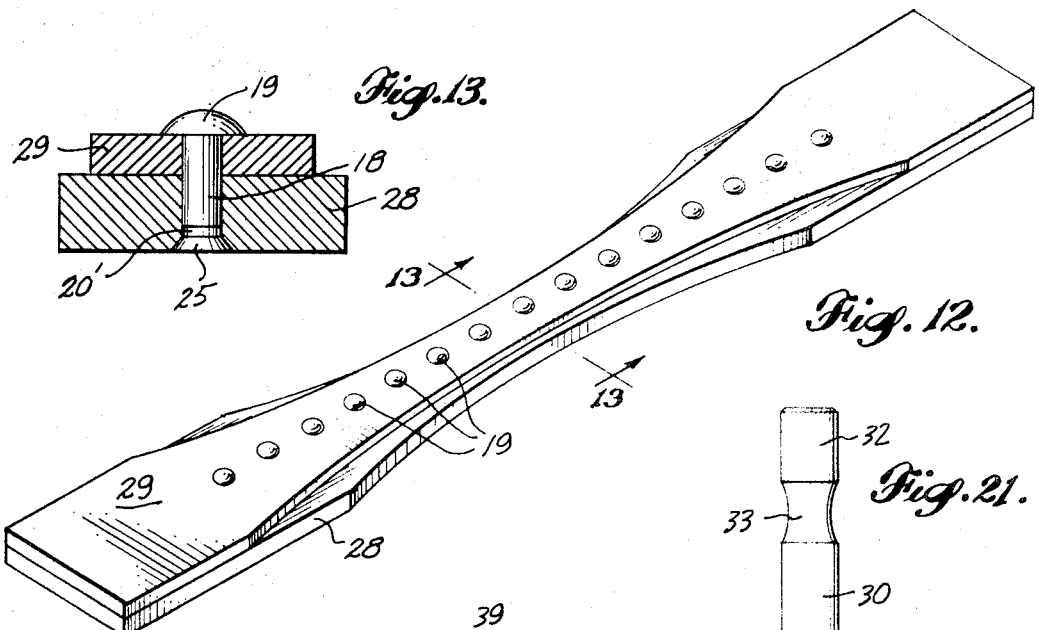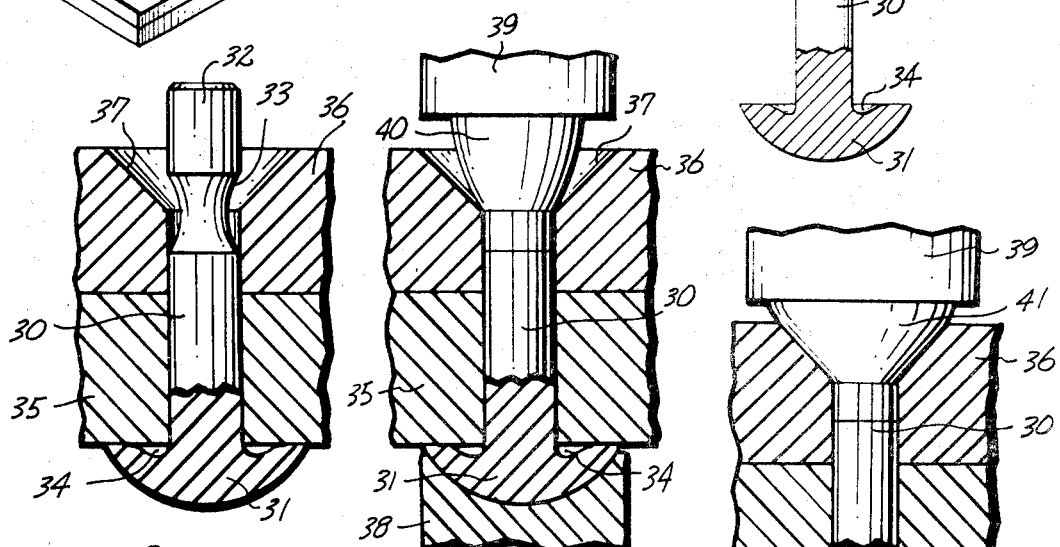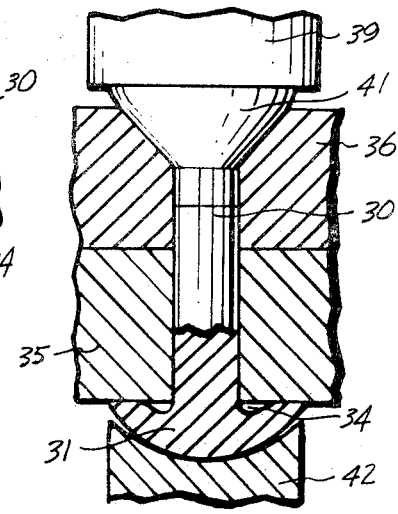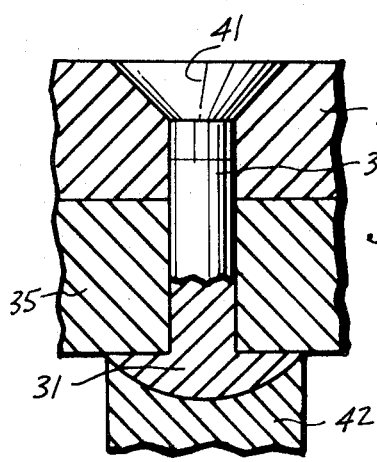

PATENTED JAN 18 1972

INVENTOR
JOSEPH G. FALCIONI
BY
Robert W. Beach
ATTORNEY

METHOD OF RIVET JOINING

This application is a continuation-in-part of application Ser. No. 417,661, filed Dec. 11, 1964, now U.S. Pat. No. 3,405,594 for Rivet Joining Method, Pin Therefor and Pin Manufacturing Method.

In the fabrication of large structures from sheet or plate material it is necessary to join the edge portions of adjacent plates or sheets. Customarily two types of joints have been used, namely, riveted joints and welded joints. Riveted joints have usually been considered to be more reliable than welded joints because it is difficult to insure the uniform high quality of all portions of a welded joint, whereas it has been felt that a riveted joint was simply mechanical and entirely reproducible. In most riveted joints the rivets are subjected to shear stress and consequently the joint was primarily designed by providing a sufficient number of rivets of large enough cross section to withstand the shear stresses which it was expected would be imposed on the joint.

In a actual practice it has been found that riveted joints frequently fail by fracture of the workpieces joined by the rivets rather than by shearing of the rivets themselves. Such joint failure has occurred particularly in instances where the joint has been subjected to flexure resulting in it being subjected to conditions of stress reversal, such as in an airplane wing structure, for example. In an airplane wing, particularly in the case of a joint extending spanwise of the wing, the load on the joint will fluctuate depending upon whether the wing is subjected to the load of supporting the airplane, as in flight, or simply the load of supporting the wing when the airplane is on the ground. Also, the stress to which the joint is subjected will fluctuate depending upon whether the airplane in flight is climbing or descending and to what extent the wing may be flexed by encountering updrafts or downdrafts.

After an airplane wing, for example, has been subjected to such variations in stress and reversal of stress, the joint may fail as a result of fatigue of the metal. In such instances it has been found that the failure of the metal occurs in the workpieces joined by the rivets, rather than the rivets themselves failing, and the failure always occurs at a rivet hole. Load tests show that a hole creates stress concentration points. Consequently it is not clear that fatigue failures in the workpieces of a joint can be overcome by reducing the size of the holes receiving the rivets and increasing the number of rivets, nor can solution of the problem be assured by varying the arrangement of the rivets.

Testing riveted joints to produce fatigue and subsequent examination of the test pieces has disclosed that the fracture of the workpieces in a riveted joint begins in the portion of the joint generally centrally between the outer faces of the joint. Further tests have indicated that customarily the rivet shank is expanded somewhat less in the central portion of the joint than adjacent to the exposed faces of the workpieces joined, and the expansion of such central portion of the rivet shank is not uniform. Such expansion has been found to vary somewhat in accordance with the procedure followed in clinching the rivet. Also, careful measurements appear to provide a correlation between the location at which the fracture of the workpiece began and the expansion of the rivet which occurred during its installation.

In general, it has been found that fatigue failure is postponed where a pin or rivet shank has been expanded to fill the receiving hole tightly and the expansion has been more uniform throughout the length of such shank. Presumably such expansion or upsetting of the pin or rivet shank produces a stress in the circumference of the receiving hole which reduces the severity of stress reversal, or stress variation, and correspondingly reduces the effect of fatigue.

It is a principal object of the present invention, therefore, to provide a riveted joint construction in which the expansion of the pin or rivet shank transversely of the length of the pin or rivet will be substantially uniform lengthwise of the shank over the length of the receiving hole, or at least in which such expansion of the pin or rivet shank will be more uniform than it is in conventional riveting practice.

More specifically it is an object to effect an increase in the expansion of the central portion of the pin or rivet shank in producing a riveted joint by deterring seizure between a portion, or portions, of the shank adjacent to an end of the rivet-receiving hole and the corresponding portion of the workpiece so that such portion of the pin or rivet shank can move toward the central portion of the rivet-receiving hole as such central portion is upset by the pin or rivet clinching operation.

A companion object is to provide a pin or rivet of special construction, or having special characteristics, to deter such seizure. An incidental object is to provide a pin or a rivet of such special character which is effective in operation and economical to produce.

The foregoing objects can be accomplished by utilizing a pin or rivet which is treated or formed specially in a zone, or zones, to be disposed adjacent to the end of a hole in workpieces to be joined adapted to receive such a pin or rivet. Such special treatment is effected to deter such contact between the portion or zone of the pin shank at an end of the pin-receiving hole and the workpiece at the hole end as to restrain movement of such portion of the pin shank relative to the hole lengthwise inwardly. By relieving a portion of the rivet adjacent to an end of the rivet-receiving hole, such as by providing a circumferential groove around the rivet shank which partially overlaps the hole end or by providing a groove on the underside of the preformed rivet head adjacent to the rivet shank, such a specially formed pin or rivet can be inserted in the hole of a workpiece and clinched with conventional clinching procedures if the rivet shank is relieved or by applying pressure to the central portion of a preformed rivet head if the underside of such head is relieved.

FIG. 1 is an elevation of a plain pin of the type conventionally used in making a riveted joint, and FIG. 2 is an elevation of such a pin having circumferential grooves formed in spaced zones.

FIG. 3 is an elevation of a pin of the type having only a single circumferentially grooved zone.

FIG. 4 is a cross section of a pin and a fragmentary portion of a cold-rolling device operating on the pin.

FIG. 5 is a section through portions of workpieces to be joined by riveting showing a pin according to the present invention in elevation at the beginning of the clinching operation, with portions of the clinching tools shown partly in section. FIG. 6 is a similar view showing an intermediate stage in the clinching operation, and FIG. 7 is a similar view showing the clinching operation completed.

FIG. 8 is an elevation of a buttonhead rivet of conventional type, and FIG. 9 is a similar elevation of a rivet of the same type having its end zone reduced in cross section.

FIG. 10 is a cross-sectional view through a joint to be riveted in which a rivet of the type shown in FIG. 9 is in place ready for the riveting operation, and FIG. 11 is a similar view of the completed joint with the rivet clinched and trimmed.

FIG. 12 is a top perspective of a conventional type of test sample incorporating rivets in accordance with the present invention and FIG. 13 is a transverse section through such sample on line 13—13 of FIG. 12.

FIG. 21 is an elevation of a buttonhead rivet with parts broken away and having a shank similar to the shank of the pin shown in FIG. 13.

FIG. 22 is a section through a riveted joint showing a rivet of the FIG. 21 type in place ready to be riveted. FIGS. 23 and 24 are similar sections showing successive stages in the riveting operation and FIG. 25 is a similar section through the completed joint.

Figure 14:
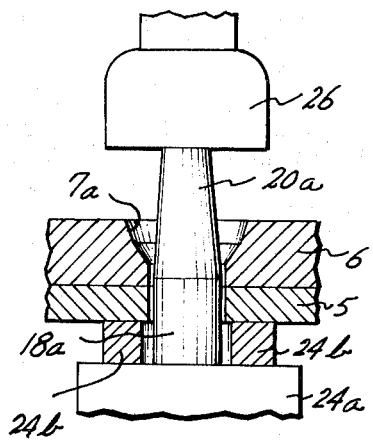
FIGS. 14, 15, 16 and 17 are sections through a riveted joint utilizing a plain pin having a tapered end to be upset into a countersunk depression, such views illustrating respectively progressive stages in the formation of the joint.

Pins used in the riveted joint-making process of the present invention may be of the unheaded cylindrical type, both ends of which are plain, or they may be rivets having one plain end and a preformed head on the opposite end. While the treatment in both cases to which the pin is subjected will be of the same general type, the particular location and shape of zone treated can differ according to the requirements of the joint and the results desired. Although a typical application of the invention is described for joining two workpieces in face-to-face relationship it will be understood that the joint may incorporate a larger number of workpieces. Also, it will be understood that representative types of pin are shown and described to illustrate the principles of the invention.

The plain pin shown in FIG. 1 is of the type used conventionally in automatic riveting machines. Such pins are, of course, available in different lengths and diameters depending upon the thickness of the joint to be made and the strength characteristics required. The rivet-receiving hole in the workpieces is cylindrical but should be drilled to close tolerances. It is preferred that the pin have a push fit in the pin-receiving hole, or even a light drive fit, but particularly for the purposes of the present invention the fit should not be a press fit. The pin may even have a loose fit in the pin-receiving hole of the workpieces, but there should not be excessive play between the pin and the hole because it is important that when the pin has been clinched it fit tightly in the hole.

The technique of the present invention is particularly advantageous for riveted joint structures of high efficiency, that is, joints which are light and strong such as are especially useful in airplanes, for example. Also, the present joining technique is very important for joints that are subjected to pronounced variations in load, which load variations tend to produce fatigue in workpieces at the joint secured together by the pins or rivets.

As has been indicated above, investigation has shown that the type of riveted joint most resistant to fatigue is one in which the pin or rivet fits tightly in the pin-receiving hole and the shank of such pin in upset condition stresses the circumference of the pin-receiving hole substantially uniformly throughout the composite thickness of the workpieces. The problem has been to devise a joint in which to obtain such uniformity of stress conditions where the pin-receiving hole and the pin are of uniform diameter. To utilize a pin-receiving hole which is not of uniform diameter, but which is tapered, increases the cost of making the joint.

In driving a pin or a rivet having a shank of uniform cross section in a hole of uniform cross section for clinching the shank, the exterior portion of the shank adjacent to its plain end to which the upsetting force is applied and outwardly of the end of the hole in which the shank is received tends to swell faster than portions of the shank inwardly of the shank-receiving hole end portion because such exterior shank portion is unconfined. In the development of the present invention it has been discovered that seizing or interference between the end portion of the shank-receiving hole and the zone of the shank which it encircles can be deterred and retarded by reducing the cross section of such shank zone, so that it must be expanded to a greater extent than other portions of the shank before the pin shank or rivet shank zone is axially immobilized by frictional engagement with the shank-receiving hole.

The pin 1 shown in FIG. 1, which is of the type conventionally sued in making riveted joints by the use of automatic clinching equipment, can be modified to produce a pin in accordance with the present invention. The external wall of the pin 1 is cylindrical. Such cylindrical shape is necked at the zone, or zones, in which it is desired to deter seizing of the pin shank during the clinching operation. Such necking condition can be accomplished by machining or rolling an annular groove 2 in the circumference of the shank zone, or by stretching the shank axially in a localized area and under controlled conditions, such as by the use of local heating, until the elastic limit of the material is exceeded to the point that an annular groove 2 is produced.

To neck the pin shank by rolling an annular groove in it, mechanism such as shown in FIG. 4 can be used, which includes a body 14 of C-clamp shape having two backing rollers 15 journaled in it in adjacent relationship to engage one side of the pin. The grooving roller 16 is carried by the reciprocable spindle 17 mounted on the horn of the frame 14 opposite that carrying rollers 15. The roller support can be reciprocated in the direction indicated by the arrow in FIG. 4 progressively as the pin 1 and frame 14 are rotated relatively to roll the groove progressively in the pin.

In driving a pin of the type shown in FIG. 2 or FIG. 3 such pin 1 is placed in a pin-receiving hole in workpieces 5 and 6, shown assembled in face-to-face contact in FIG. 5. If it is desired for one end of the riveted pin to be flush with the exterior surface of a workpiece when the joint has been completed, one end 7 of the pin-receiving hole can be countersunk, as shown. The pin can be held against dropping out of the pin-receiving aperture by a presser tool 8 having in one side a head-forming cavity 9 in which the lower end of the pin rests. A percussion tool 10 engages the upper end of the pin 1.

In clinching the pin 1 by the use of an automatic riveting machine, the workpieces 5 and 6 and the percussion tool 10 are held in the fixed relationship shown in FIG. 5 while the presser tool 8 is moved toward the work from the position shown in FIG. 5 to that of FIG. 6. By such movement the lower end portion of the pin will be expanded to the degree necessary to make the shank fit tightly in the pin-receiving hole and the plain lower end of the pin will be upset to form the head 12. When the presser tool has seated against the lower side of the workpiece stack, the percussion member 10 will be actuated to strike the upper plain end of the pin for the purpose of expanding further the pin shank in the pin-receiving hole, and also will cause the upper plain end of the pin to mushroom for the purpose of forming a head 13 which fills the countersunk cavity 7 in the manner shown in FIG. 7.

It has been found that during such clinching operation the grooves of the shank zones 2 deter the seizing of the shank on the sides of the bore through the workpieces. Consequently, the portion of the pin shank between the grooved zones 2, that is, nearer the center of the pin-receiving hole, will be expanded to press against the walls of the hole during the initial stages of the clinching operation before the zones 2 are pressed tightly against the sides of the bore. During the clinching operation, the zones 2 would, of course, expand laterally more rapidly than the portions of the pin shank of greater cross section because of the greater force concentration in these sections, but also it would be necessary for such necked zones to expand to a considerably greater degree than the other portions of the pin shank before seizing could occur between such necked portions and the wall of the pin-receiving hole. Because such zones have farther to expand to fill the hole they will be less inclined to seize the encircling portions of the hole and will be moved axially to a greater extent during clinching of the pin so as to enable a greater degree of lateral expansion of the central portion of the pin shank to be effected.

Eventually, of course, the expansion of the zones 2 will effect seizure between these portions of the pin shank and the encircling portions of the pin-receiving hole, but such seizure will follow, rather than precede, tight engagement of the central portion of the pin shank with the wall of the hole. Because the exterior pin shank is unrestrained immediately outwardly from each end of the pin-receiving hole, such portions of the pin, meeting no resistance to expansion, tend to expand more rapidly than portions of the shank within the hole which engage the wall of the hole. Consequently, in the conventional clinching operation seizure between the laterally expanding or mushrooming pin shank and the wall of the hole almost invariably occurs earliest at one or both ends of the pin-receiving hole in the workpieces. By simply providing necked portions on a pin to be riveted, a more uniform engagement between the pin shank and the wall of the pin-receiving hole is obtained throughout the length of such hole.

In some instances it may be found that the portion of a machine-driven pin shank binds more tightly adjacent to one end of the pin-receiving hole than adjacent to the other end of such hole. Under such circumstances substantially uniform expansion of the pin shank may be accomplished during clinching if the pin 1 is relieved or necked from the original condition of FIG. 1 at a single zone 2, as shown in FIG. 3, adjacent to only one end of the pin-receiving hole. The procedure for clinching such a pin would be similar to that described in connection with the procedure of FIGS. 5, 6 and 7.

While the technique of treating a pin to form a zone for deterring seizing has been described above, the same considerations and the same procedure may be applied to a rivet having a preformed head, such as the rivet 18 having the preformed head 19, shown in FIG. 8. Such a rivet is clinched by backing the head 19 when it is held against one side of a stack of workpieces while the plain end of the rivet is pressed or impacted to expand the rivet shank into tight engagement with the rivet-receiving hole and upset the plain end of the rivet. Under these circumstances the upsetting action tends to occur adjacent to the end of the rivet-receiving hole next to the plain end of the rivet. The object of the present invention can therefore be accomplished if the plain end of the rivet shank is reduced in cross section as shown in FIG. 9. The same general type of technique is employed to neck the plain end of the rivet shank as to form a reduced zone. Thus, such plain end is machined or rolled to form the reduced portion 20 shown in FIG. 9.

In FIGS. 10 and 11 the procedure for clinching a rivet of the type shown in FIG. 9 is illustrated. The buttonhead 19 of the rivet is embraced by the cavity of the anvil 24 which holds the shoulder of the rivet head tightly against the adjacent surface of the workpiece 5. The reduced plain end 20 of the rivet is then either pressed, or impacted, such as with the percussion tool 26, both to effect upsetting of the rivet shank generally into tight engagement with the shank-receiving hole in the workpieces 5 and 6 and to mushroom the end of the rivet shank to form a head 25 which fills the countersunk cavity 7, as shown in FIG. 11. The end of such tool 26 engaging the end of the rivet shank may have in it a cavity 27 to assist in maintaining contact between the percussion tool and the end of the rivet. As the rivet is struck the portion of the rivet shank between the treated portion 20 and the head 19 will engage the wall of the rivet shank-receiving hole first. Subsequently the reduced portion of the rivet shank will be expanded to press against the portion of the shank-receiving hole encircling it because of the greater amount of expansion required resulting from the reduced condition of such portion. Seizure between the reduced end portion of the rivet shank and the encircling portion of the workpiece 6 will be deterred relative to the lateral expansion of the portion of the rivet shank between the reduced portion 20 and the rivet head 19.

Because of the delay in seizure of the reduced portion 20 of the rivet shank, the expansion of that portion of the rivet shank between such reduced portion and the rivet head will be expanded generally uniformly to exert a stress in the shank-receiving hole which is substantially uniform throughout the length of the rivet shank. Because seizure of the reduced zone of the rivet shank is deterred such zone will be moved a substantial distance toward the rivet head 19 before it is expanded sufficiently to seize the encircling portion of the shank-receiving hole wall in workpiece 6, as shown in FIG. 11. Consequently the stress in the portion of the rivet shank-receiving hole encircling the reduced portion 20 will be approximately equal to the stress in the remainder of the rivet-receiving hole produced by swelling of the rivet shank. As a result, the riveted joint is able to withstand fatigue stress much more effectively and is much less subject to fatigue failure.

As has been discussed above, the principal improvement in riveted joints utilizing the present invention is manifested in increased resistance to fatigue. The fatigue characteristics of a riveted joint can be determined by subjecting to a standard fatigue test a standard type of test specimen shown in FIGS. 12 and 13. In this specimen the workpieces 28 and 29 are secured together by rivets 18 having on one end heads 19 and on the other end the mushroomed countersunk heads 25. The outer face of this head is shown as having been machined flat to a condition substantially flush with the outer surface of the workpiece 28 from the slightly bulged condition shown in broken lines in FIG. 11, which would exist upon completion of the clinching operation. In order to compare accurately the results of such fatigue tests the size and shape of the workpieces 28 and 29 are specified and the size, number and spacing of the rivets 18 along the workpiece are prescribed.

A standard procedure for subjecting a test specimen such as shown in FIGS. 12 and 13 to a fatigue test, is to place the specimen under tension stress and then successively to approximately double the tension stress and then completely release all tension stress alternately in rapid succession. Thus, for example, if the test specimen shown in FIG. 12 is 30 inches in length, approximately 4 inches in width, part 29 is approximately 5/16 of an inch in thickness and part 28 is approximately ½ inch in thickness, the test specimen can be placed under an initial tension of 24,000 pounds. During the test the tension force will alternately be increased to 48,200 pounds and reduced to 200 pounds compression. Such reversal of force application is effected 10 times per second.

Under these conditions of test it has been found that the conventional riveted joint, whether produced by hand or by a riveting machine, will fail after being subjected to 30,000 to 35,000 cycles of stress reversal where the parts and rivets are made of an aluminum alloy. By comparison, a test specimen made of the same material and dimensions, except that rivets and the riveted joint of the present invention are used, has been able to withstand as much as 126,000 stress reversal cycles before failure. In every instance failure occurred in the workpieces 28 and 29 being fractured transversely of their lengths at the location of one of the rivets in the central portion of the test specimen.

In FIGS. 14 to 17 a somewhat modified type of pin to be riveted is shown. In this instance the pin is unheaded and has a cylindrical shank 18a comparable to the shank 18 of the rivet shown in FIG. 10. From such cylindrical portion the pin shank is reduced by being tapered to one end to form the frustoconical section 20a. This pin can be inserted in an aperture in workpiece plates 5 and 6 having a deep double-angled countersunk depression 7a in the end of the aperture encircling the tapered frustoconical end portion 20a of the pin.

The unheaded cylindrical portion 18a of the pin is located in the work aperture by the end of the cylindrical portion 18a of the rivet shank resting on an anvil 24a which is spaced from the adjacent surface of the work by spacer blocks or a spacer ring 24b. The length of the cylindrical portion 18a of the rivet shank and the thickness of the spacer members 24b are such that the shoulder between the cylindrical portion 18a and the tapered portion 20a of the rivet shank is located inwardly from the adjacent end of the work aperture at the bottom of the countersink 7a. Consequently, as in the rivet described in connection with FIG. 10, the rivet shank is reduced at the location of the rivet-receiving aperture end at the bottom of the countersink.

Figure 15:
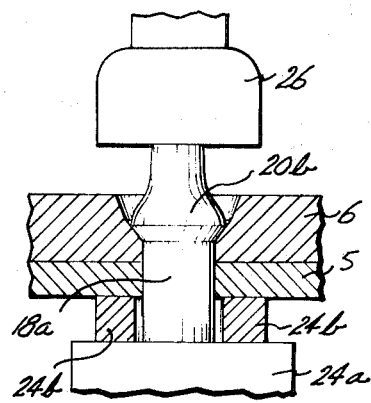

When a hammer or percussion tool 26 impacts the end of the tapered reduced portion 20a of the rivet shank, such tapered portion will be upset, such as to the condition illustrated in FIG. 15 at 20b. Because the spacer blocks 24b prevent the anvil 24a from moving the cylindrical portion 18a of the rivet shank upward, the expansion of the cylindrical portion of the shank will occur primarily in the center of the aperture and then toward the upper end of the aperture as the tapered end of the shank is upset. The spacers 24b should not be withdrawn until after the tapered portion of the shank has been expanded into the countersink 7a to a width exceeding the width of the cylindrical aperture through the workpieces. Preparatory to the next stage of the rivet-setting operation from the condition of FIG. 15 to that of FIG. 16, the spacers 24b will then be withdrawn.

Figure 16:
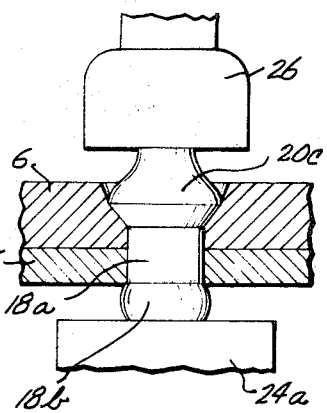
Figure 17:
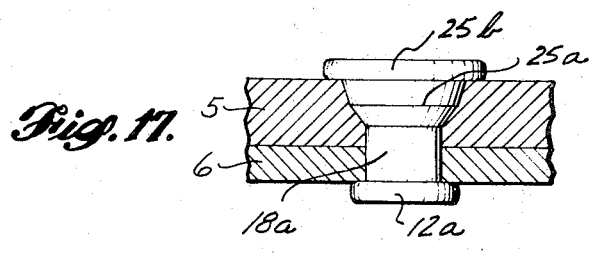

As the riveting operation then continues, the initially tapered end portion of the rivet shank will be upset farther from the condition 20b of FIG. 15 to the condition 20c of FIG. 16. Meanwhile, the anvil 24a will have been moved closer to the outer surface of the adjacent workpiece 5 and will have expanded farther the cylindrical portion 18a of the rivet shank to press against the sides of the work aperture while moving material of the rivet lengthwise inwardly. As such expanding movement continues, the cylindrical portion of the pin shank will be upset beyond the sides of the aperture in the work plates to form the upset shape 18b. When the riveting operation is completed the cylindrical end of the rivet pin will have formed the head 12a while the frustoconical end 20a of the shank will have been formed as a portion 25a filling the countersunk depression 7a and a head portion 25b projecting beyond the countersink and having its edge portions overlying the outer surface of the workpieces 5. In this rivet, also, it will be found that the shank has been expanded to exert substantially uniform pressure on the walls of the work aperture throughout its length.

Figure 18:
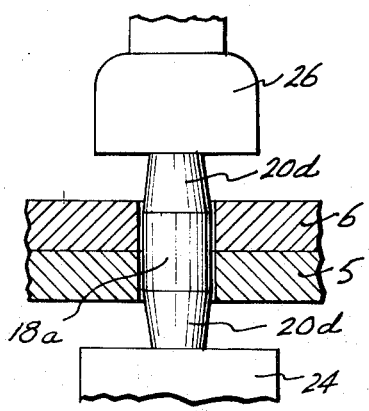
FIGS. 18, 19 and 20 are sections through a different type of joint formed by the use of a pin having its opposite ends tapered and such views respectively illustrate different stages in the riveting operation.
Figure 19:
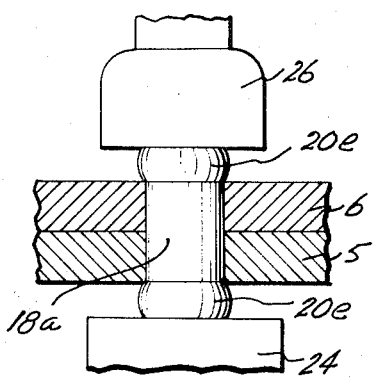
Figure 20:
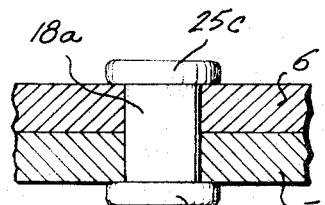

The pin used in making the joint of FIG. 20 has a cylindrical shank portion 18a and two oppositely tapered end portions 20d. The length of the central cylindrical portion 18a is less than the total thickness of the workpieces as shown in FIG. 18 so that reduced portions of the pin will be in registry with both ends of the aperture through the work. Such a pin can be headed by applying an anvil 24 to one end and a hammer or percussion tool 26 to the opposite end. Both of these implements would be moved toward the work simultaneously from the positions of FIG. 18 to positions such as shown in FIG. 19.

During such initial portion of the driving operation, the cylindrical central portion 18a of the pin would be expanded transversely of the length of the pin into close engagement with the wall of the work aperture. Seizing of the portions of the pin at opposite ends of the aperture would be delayed because of the reduced portions of the pin in registry with the ends of the work aperture. After the central portion of the pin had been expanded into tight engagement with the aperture walls, the portions of the tapered ends 20d outwardly from the work would be upset transversely of the length of the pin to positions beyond the work aperture to form the upset portions 20e. Upon completion of the setting operation, such upset portions would become rivet heads 25c as shown in FIG. 20.

The underside of the head 19 of the buttonhead rivet shown in FIGS. 9 and 10 is flat and, consequently, as this rivet is being driven the portion of the shank adjacent to the head cannot move inwardly. It is possible, therefore, that after such a rivet has been set to the condition shown in FIG. 11, the pressure between that part of the rivet shank 18 adjacent to the head 19 may not be as great as that between other portions of the rivet shank and the corresponding portions of the aperture. To enable the pressure between the portion of the rivet shank adjacent to a buttonhead and the portion of the work aperture in which it fits to be increased, a rivet of the type shown in FIGS. 21 to 25 may be used.

The rivet of FIG. 21 includes a shank 30 having on one end a buttonhead 31 and its other end is formed as a plain tip 32. Adjacent to the plain tip end of the rivet shank is an annular groove 33 corresponding generally to the groove 2 in the shanks of the pins shown in FIGS. 2 and 3. Such necked portion will be located so that when the rivet has been inserted into an aperture in a workpiece, the necked zone will be located relative to the workpieces so that at least a portion of such zone is encircled by an end of the hole through the workpieces. The head of this rivet has in its underside next to the work an annular groove 34 closely encircling the root of the rivet shank 30. The purpose of this groove is to enable the rivet head to be deformed during the clinching operation to provide additional shank length and material at an intermediate stage in the clinching operation to be swaged into the end of the work hole adjacent to the rivet head.

In making a joint between workpieces, such as the plates 35 and 36 shown in FIGS. 22 to 25, by using a rivet of the type shown in FIG. 21, the rivet is first inserted into the work aperture to the position shown in FIG. 22. Preferably one end of the work aperture is formed as a flaring countersunk cavity 37 and the rivet will be inserted into the work hole so that the plain end 32 is at the end of the work hole having such cavity. The rivet should fit snugly in the work aperture when thus inserted and may have a light drive fit, but should not be required to be pressed into the aperture by substantial pressure. As mentioned above, the rivet selected for a particular joint should be of a length such that at least a portion of the necked zone 33 of the rivet shank is in registry with the end of the uniform cross section portion of the work hole at its junction with the flared cavity 7.

In clinching the rivet of FIG. 21, the convex side of the buttonhead 31 is embraced by the complementally concave cavity of an anvil 38. The plain end of the rivet is subjected to impacts by the percussion tool 39 while the anvil 38 holds the buttonhead 31 in engagement with the surface of the joint opposite the cavity 37. The first effect of the driving force on the rivet will be to expand its shank. Because the cross-sectional area of the necked zone 33 of the rivet shank is less than that of other portions of the rivet shank and such necked zone is unconfined laterally, such necked zone will expand transversely of the length of the rivet shank more rapidly than other portions of such shank. The surface of this portion must, however, be displaced farther than other portions of the rivet shank in pressing against the wall of the work hole.

Consequently, during the rivet-clinching operation the pressure of the portion of the rivet shank inwardly from the necked zone against the wall of the work hole will be increased first by shortening of the rivet shank as it is longitudinally contracted toward the rivet head.

As the rivet shank continues to be upset, the central portion of the rivet shank lengthwise of such shank immediately inward from the necked portion 33 will begin to seize the wall of the work aperture so as to deter and finally prevent further shortening of that portion of the rivet shank adjacent to the head 31. Consequently, thereafter the pressure of the rivet shank adjacent to the necked zone 33 against the wall of the work hole will continue to increase while the pressure of that portion of the rivet shank adjacent to the head 31 against the wall of the hole will not increase appreciably. Increase in pressure of the portion of the rivet shank adjacent to the necked zone 33 against the wall of the work hole will be substantially terminated when the necked zone of the rivet shank has been expanded to approach the condition shown in FIG. 23 filling the work aperture, and the portion of the rivet shank outwardly from the uniform cross-sectional area portion of the work hole has begun to form a mushroomed end 40.

Application of the percussion tool 39 to the mushrooming end of the rivet shank will be continued until the plain end has mushroomed sufficiently to fill the flared cavity 37 and form the countersunk rivet head 41 shown in FIG. 24. At this stage of the clinching operation the percussion will be interrupted and an anvil 42 such as shown in FIG. 24 will be substituted for the anvil 39 shown in FIG. 23 to engage the buttonhead. The cavity of the anvil 42 is shallower than the cavity of the anvil 38 so that instead of such cavity being complemental to the exterior surface of the buttonhead as formed, only the central portion of the anvil cavity will be engaged with the central portion of the rivet head initially.

Percussion of the tool 39 against the mushroomed head 41 of the rivet will then be resumed while the anvil 42 is pressed against the rivet head in the manner shown in FIG. 24. Because the pressure of that portion of the rivet shank adjacent to the head 31 against the wall of the work hole is less than the pressure of other portions of the rivet shank against the work hole the portion of the rivet shank adjacent to the head will be moved lengthwise inward as it is upset and, consequently, expanded laterally farther to increase its pressure against the corresponding portion of the work aperture wall. Provision of the groove 34 in the underside of the rivet head at the root of the rivet shank will enable such further lengthwise inward upsetting movement of the rivet shank to occur. By such movement the size of the groove 34 will be decreased and the radius of curvature of the exterior of the rivet head will increase until the shape of the convex side of the rivet head becomes complemental to the shape of the cavity in anvil 42 as shown in FIG. 25.

When the rivet-clinching operation has thus been completed, the percussion tool 39 and the anvil 42 can be removed from the opposite ends of the rivet and any protuberance of the mushroomed rivet head 41 beyond the surface of the plate 36 can be machined off the leave the outer face of the countersunk rivet head flush with such surface of the plate. It will be found that the lateral pressure distribution between the rivet shank and the work aperture in which it is received will be much more nearly uniform throughout its length than in the case of conventional buttonhead riveted joints.

I claim:

1. The method of rivet-joining a pack of metal workpieces including a plurality of workpieces in face-to-face relationship which comprises providing through the pack of workpieces a pin-receiving hole having a substantially cylindrical portion, making a pin having a substantially cylindrical shank portion receivable in such workpiece hole, fabricating the structure of a lengthwise zone of such pin of a character to postpone the expansion of such zone transversely of the length of the pin to a cross-sectional area exceeding the cross-sectional area of a portion of the pin adjacent to such zone when pressure is exerted longitudinally on the pin, inserting such pin through such workpiece hole with a cylindrical shank portion of the pin received in a cylindrical portion of such hole and such structurally fabricated zone partially inward from and partially outward from one end of the cylindrical portion of such hole to postpone seizing between such pin shank zone and the portion of the workpiece hole encircling such zone until after a substantial part of the cylindrical pin shank portion inwardly from such zone has been expanded into intimate engagement with the wall of the cylindrical portion of the workpiece hole, and applying force to one end of the pin lengthwise of the pin in unheated condition for expanding the cylindrical portion of the pin within the cylindrical portion of the workpiece hole, for simultaneously moving such structurally fabricated pin zone lengthwise inwardly relative to the workpiece hole and for thereafter upsetting and clinching the end portion of the pin adjacent to such zone.

2. The method of rivet-joining a pack of metal workpieces including a plurality of workpieces in face-to-face relationship, which comprises providing a pin-receiving hole through the workpiece pack having a substantially cylindrical portion, inserting through such hole a pin having a cylindrical shank portion fitting snugly in part of the cylindrical portion of such workpiece hole, having a zone adjacent to one end of the cylindrical shank portion which zone is of reduced cross section and part of which zone is located inwardly of and part outwardly from one end of the cylindrical portion of such hole to deter seizing between such zone and the portion of the workpiece hole encircling such shank zone and the pin having a plain end portion adjacent to such shank zone and exteriorly of the pin-receiving hole through the workpiece, and exerting force on the plain end portion of the pin in unheated condition in a direction lengthwise of the pin for expanding the cylindrical portion of the pin within the cylindrical portion of the workpiece hole while expanding laterally the reduced cross section zone of the pin and upsetting the plain end portion of the pin.

3. The method of rivet-joining a pack of workpieces including a plurality of workpieces in face-to-face relationship, which comprises providing a pin-receiving hole through the workpieces having a cylindrical portion, making a rivet having a cylindrical shank portion and a preformed head on the end of such cylindrical shank portion with an annular recess in the underside of such head adjacent to such cylindrical shank portion, inserting the rivet into the workpiece hole until the portion of the rivet head underside encircling such annular recess engages an exterior surface of the workpiece pack, upsetting the end portion of the rivet shank opposite such preformed head while substantially contiguously backing the preformed head, and thereafter applying longitudinally of the rivet shank greater pressure to the central portion of the preformed head than to the marginal portion of the preformed head in a direction toward the rivet shank for moving the central portion of the preformed head and the portion of the shank adjacent thereto inwardly relative to the marginal portion of the preformed head.

* * * * *